March 14, 1944.    H. RAUH    2,344,410
CLUTCH MECHANISM FOR ACCOUNTING MACHINES
Filed Dec. 8, 1939    4 Sheets-Sheet 1
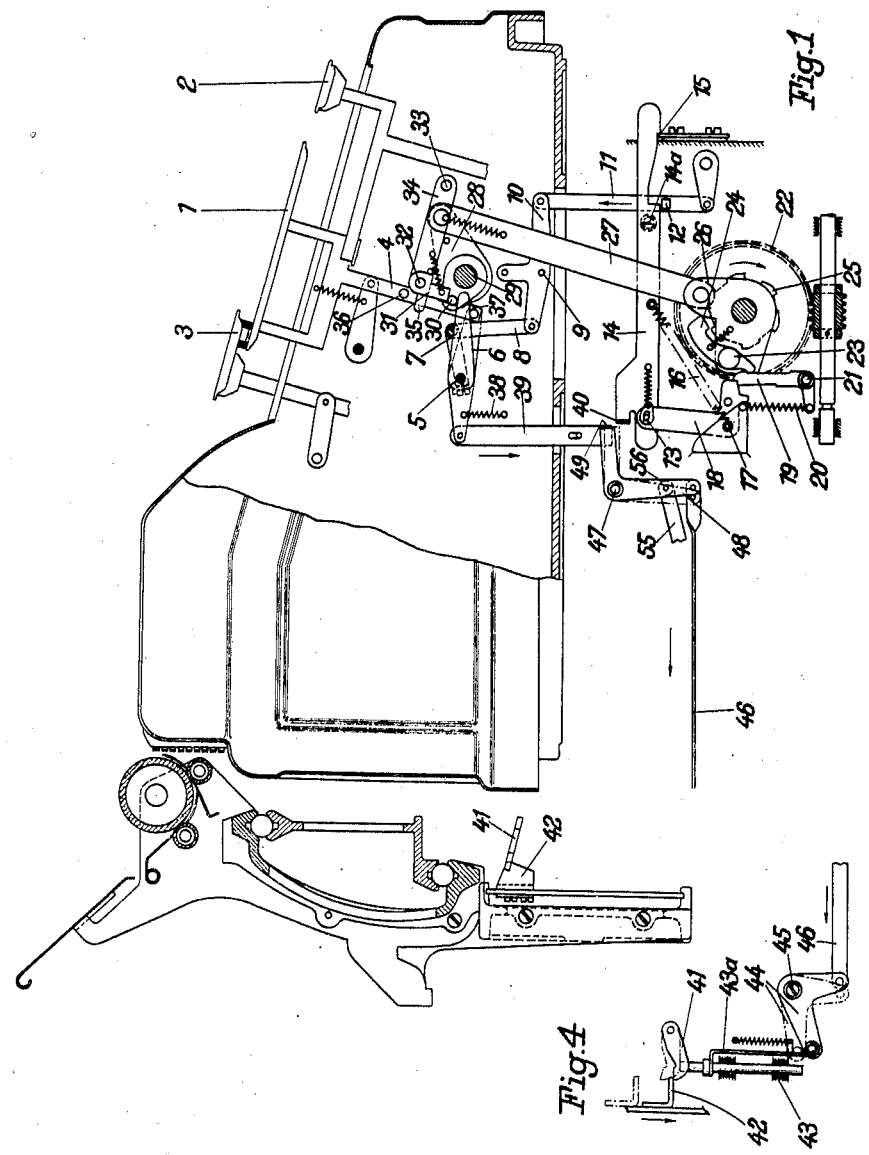
Inventor:
H. Rauh
By C. F. Wendiroth
Atty March 14, 1944.    H. RAUH    2,344,410
CLUTCH MECHANISM FOR ACCOUNTING MACHINES
Filed Dec. 8, 1939    4 Sheets-Sheet 2
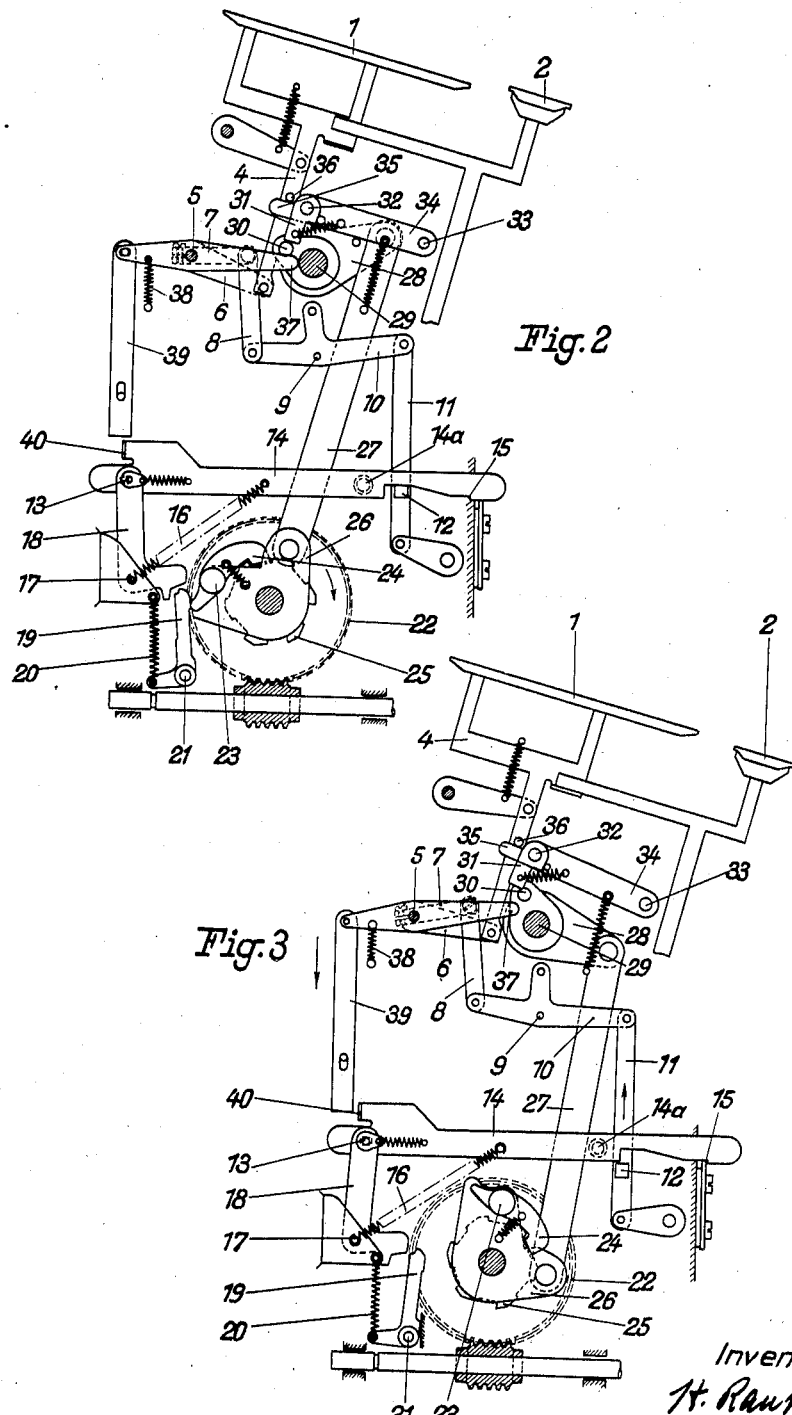
Inventor:
H. Rauh Patented Mar. 14, 1944

2,344,410

UNITED STATES PATENT OFFICE 2,344,410

CLUTCH MECHANISM FOR ACCOUNTING MACHINES

Hermann Rauh, Berlin-Zehlendorf, Germany; vested in the Alien Property Custodian Application December 8, 1939, Serial No. 308,262
In Germany January 17, 1939

5 Claims. (Cl. 192—33)

In commercial accounting machines, especially bookkeeping machines, the motor keys are automatically locked during the period of an operation in order to avoid disturbances in the machine, so that the motor keys can be actuated again only after the expiration of this period. The locking of the motor keys occurs therefore in these known accounting machines.

a. During the operation of the calculating shaft,
b. During tabulation,
c. During actuation of the accumulating mechanism drum,
d. During operation of total, sub-total keys, etc.

This renders difficult the manipulation of the accounting machine because the operator must wait each time until the instant operation is completed before he actuates a motor key. When a motor key is depressed prematurely the operator feels the resistance of the locking mechanism so that he becomes insecure in the actuation of the machine.

The invention is designed to make it possible for the motor keys, for instance the tab key, skip-tab key and non-tab key, to be actuated during the course of the operation of the machine so as to preliminarily set the machine for the next following operating cycle without any disturbance occurring in the machine, that is, in such a manner that the instant operation, for example the rotation of the calculating shaft, the shifting of the carriage, the actuation of the accumulating mechanisms or the operation of the total keys, etc., takes place without any serious disturbance, and then without any further depression of the motor keys a succeeding operation follows the completed one.

It is therefore an object of the invention to provide means whereby the machine may be operated without hindrance from the usual locks and the working speed of the machine may nevertheless be increased even though the rotational speed remains the same.

A further object of the invention is to provide a construction in which a locking mechanism disabled by one of the motor keys in order to drive the machine is maintained in disabled condition until the termination of a particular operation.

With the above and other objects in view which will appear from the detailed description below, the invention is shown in the drawings in which:

Figure 1 is a side elevational view with portions shown in cross-section illustrating the various means cooperating with the disabling mechanism for the clutch locking means of the machine drive.

Figure 2 is a somewhat similar view to Figure 1 showing the parts in the positions occupied at the time the clutch is freed for operation and with the clutch locking means disabled.

Figure 3 is a similar view showing the various parts in the positions occupied just prior to the completion of a half revolution of the clutch.

Figure 4 is a fragmentary view illustrating the blocking means controlled by the carriage stops.

Figure 5:
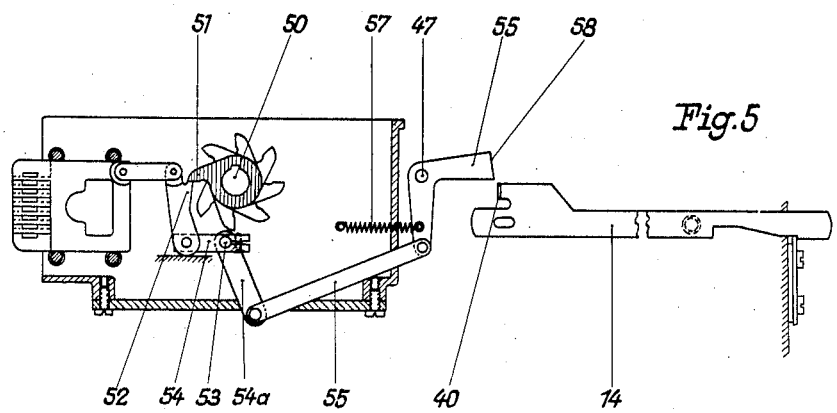
Figure 5 is an elevational view illustrating the blocking means for the clutch disabling means controlled by the accumulating mechanism drum.

I. *The means for blocking the disabling means for the clutch controlled by rotation of the calculating machine*

In Figure 1 the means under the operation of the motor keys 1, 2 and 3 for releasing the clutch disabling means is shown and the blocking means for the clutch disabling means under the control of the calculating shaft is also shown.

Figures 2 and 3 show the various elements in different operational positions.

The tab motor key is shown at 1, the non-tab motor key at 2 and the skip-tab motor key at 3. Upon depression of any one of these keys from the inoperative position shown in Figure 1, a rod 4 is moved downwardly and oscillates a lever 6 fixed to an axle 5. A lever 7 mounted on the same axle 5 is oscillated so as to lift through the intermediary of the link 8 and a multi-armed lever 10 oscillatable about a pivot pin 9, a link 11. This releases the bar 14 from the notch 15 due to the abutment 12 pivoting the bar 14 about the pivot pin 13. The bar 14 can then move to the left under the action of the spring 16 and this movement rotates the bell crank lever 18 which is pivotally mounted on a pivot pin 17 so that a pawl 19 is oscillated under the action of the spring 20 about its pivot pin 21 and in turn frees the pawl 24. The pawl 24 is pivotally mounted on a crank and oscillates about a pivot pin 23. Upon release of such pawl by the pawl 19 the spring coacting therewith brings the pawl 24 into engagement with the ratchet wheel 25, thereby coupling the driving wheel 22 and the driving crank 26.

If after being thus coupled the driving crank 26 is rotated through 360° a crank 28 upon the calculating shaft 29 is first oscillated forwardly about 90° by means of the connecting rod 27 and then oscillated backwardly about 90°. At the beginning of this oscillating movement a pin 30 provided on the crank 28 or upon a separate crank coupled to such crank 28 engages under the end face of a pawl 31 which is spring-controlled and pivotally mounted on a pin 32 provided on a lever 34 oscillatable about a pin 33.

The pawl 31 during the first oscillation of about 45° by the crank 28 is first positively lifted to the position shown in Figure 3 so that the depressed motor key is positively returned to its inoperative position by the extension 35 of the lever 34 bearing against a pin 36 provided on the rod 4. After the crank 28 has terminated such movement of about 45° the pin 13 will move away from the end face of the pawl 31 and release the lever 34 so that such lever will drop into its initial position shown in Figure 1. During this operation the disabling or releasing bar 14 has been shifted towards the right by the connecting rod 27 coacting with the roller 14a so that it is again held by the notch 15 (Figure 3). It is again possible to depress the motor key until the pin 36 encounters the extension 35. This depressing of a motor key again lifts the bar 14 from the notch 15 and such bar remains in such position. However, it cannot yet move sufficiently far towards the left so as to disengage the bell crank lever 18 due to a blocking mechanism which prevents such movement.

This separate blocking mechanism comprises a lever 37 oscillatable about the axle 5 and which under the action of pull spring 38 urges rod 39 downwardly. As long as the lever 37 is under the action of the spring 38 the rod 39 will be maintained in its lowermost position so that the lower end thereof blocks the bent over portion 40 upon the bar 14. The bar 14 therefore cannot shift to the left as long as the rod 39 remains in the lowered position. This is the situation during the actuating movement of the calculating shaft. It is only when the pin 30 upon the backward movement of the crank 28 towards its normal position, see Figures 1 and 2, strikes against the lever 37 and oscillates such lever downwardly, that the rod 39 is lifted and frees the bar 14 so that if the bar 14 has been previously lifted out of the notch 15 such bar may now shift to the left and bring about a new cycle of the calculating shaft.

The blocking means, therefore, comprises a slide 39 which cooperates with the main disabling slide 14.

In the same manner other blocking slides are provided which cooperate with the main disabling bar 14 in order to prevent a release of the motor drive during tabulation, actuation of the accumulating drum and the operations initiated by the total, sub-total keys and the like.

II. *The blocking means controlled by the carriage tabulation*

Referring to Figure 4, a pawl 41 holds the carriage at the stop 42 provided upon the carriage stop bar. The pawl 41 moves the axle 43 to the extreme position shown in Figure 4 wherein a bell crank lever 44 oscillatable about a pin 45 and coupled with the pawl by the rod 43a is held in the position shown in full lines. The lever 44 is connected to a rod 46.

If the pawl 41 is moved out of the path of the stops, the stop 42 will move into the position shown in dot-dash lines and the lever 44 will be oscillated to the position also shown in dot and dash lines. This means that the bar 46 will be pulled to the left in the direction of the arrow shown in Figure 4. Referring to Figure 1, the rod 46 is connected to a bell crank lever 48 which is pivotally mounted upon a pin 47 and the end face 49 of the horizontal arm of this bell crank lever is so located as to block or unblock the bent over end 40 of the bar 14.

When the pawl 41 is in the position shown in Figure 4 in dot and dash lines the bell crank lever 48 is also in the dot and dash lines position so that its end face 49 will block the end 40. The disabling bar 14 therefore cannot shift to the left and consequently the motor cannot be uncoupled yet. It is only when the carriage has moved to the next following column in which another stop 42 will bear against the pawl 41 and press such pawl into the position shown in Figure 4 in full lines, that the end face 49 of the bell crank lever 48 will be lifted out of the path of the end 40 upon the disabling bar 14 so that a new calculation operation may be carried out, since the bar 14 has already been freed by the motor key depressed during the instant operation.

III. *The blocking of the disabling bar by the accumulating mechanism*

Figure 6:
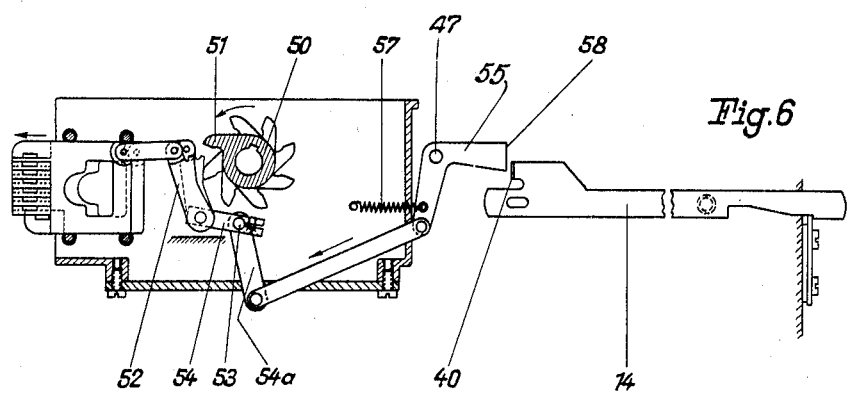
Figure 6 is a view similar to Figure 5 with the parts in blocking position.

Referring to Figures 5 and 6, a cam drum 50 rotates with the accumulating mechanism drum until a cam 51 strikes against a coordinated abutment 52. At the beginning of the movement of the accumulating drum, the abutments 52, as is known, are removed from the path of the cam drum 50 (Fig. 6). An angle lever 54, 54a, oscillatable about a pin 53, is coupled with the group of abutments 52. As long as one of the abutments 52 is depressed by a cam 51 of cam drum 50, the angle lever 54, 54a and a link 55 are in the position shown in Fig. 5 and thus keep the end face 58 of a bell crank lever 56, pivotable about a pin 47, in opposition to the action of a spring 57, out of the path of the bent over end 40 of the main locking bar 14. If at the beginning of the rotation of the accumulating mechanism the abutments 52 are removed from the path of cam 51 (as shown in Fig. 6), the angle lever 54, 54a is oscillated about pin 53, whereby the bell crank lever 56 suddenly moves into the position shown in Fig. 6, in which its end face 58 is in the path of the bent over end 40 of the main locking bar 14, so that this bar cannot move towards the left, and consequently during the movement phase of the accumulating mechanism drum no fresh calculation can be carried out.

IV. *The blocking of the disabling bar under the control of a total key and the like*

Figure 7:
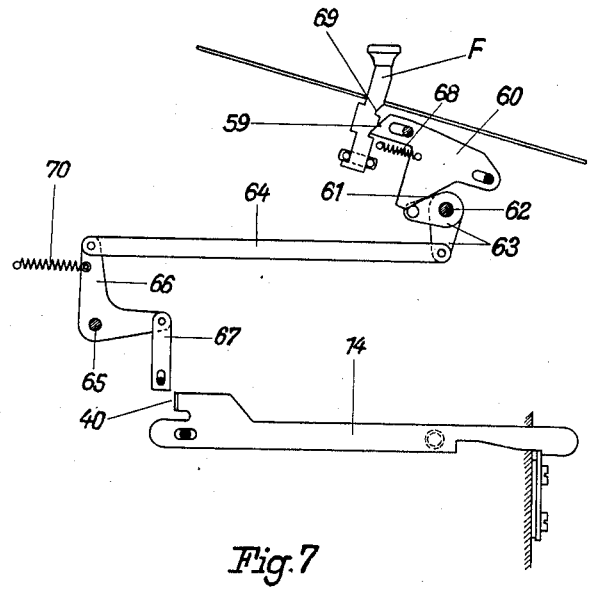
Figure 7 is a side view of a blocking mechanism controlled by a total or sub-total key and the like, and Figure 8 is a view similar to Figure 7 with the parts located in blocking position.
Figure 8:
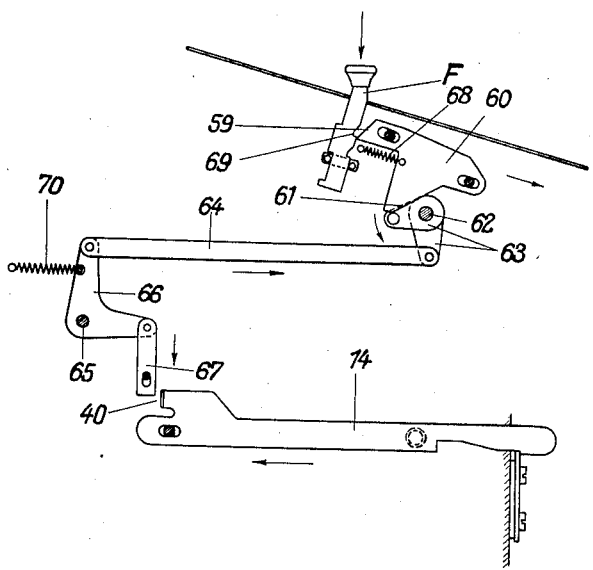

Referring to Figure 7 which illustrates the normal position and Figure 8 which illustrates the position in which blocking occurs, a key F when depressed, pushes a slide 60 towards the right by means of its inclined face 59. This slide oscillates by its inclined face 61 a bell crank lever 63 oscillatable about pin 62. This bell crank lever oscillates, through the intermediary of a connecting rod 64, a bell crank lever 66 oscillatable about a pin 65, and thereby lowers a slide 67 so that the lower edge of this slide, during the depression of the key F, enters the path of the bent over end 40 of the main locking bar 14. As soon as the key has been pressed into its lowest position, the slide 60 can suddenly engage, under the action of its tension spring 68, into the notch 69 of the key provided for this purpose and thus liberate again the angle lever 63, so that under the action of the spring 70 the slide 67 is again withdrawn from the path of the main locking bar 14.

I claim:

1. In an accounting machine having a main drive shaft, the combination with a power-driven clutch; of clutch-control mechanism normally latched in position to maintain the clutch disabled; a spring operable upon the clutch-control mechanism to free the clutch for operation; a starting key; means operable by the starting key on depression, thereof, to unlatch the clutch-control mechanism, to free it to the action of its spring; means to restore the clutch-control mechanism to its latched position during the first half revolution of the clutch; means operable during the first half revolution of the clutch to positively restore the starting key and said means operable thereby to their normal positions, and to release the starting key and its said means early in the second half revolution of the clutch, to enable the starting key to unlatch the clutch-control mechanism for operation by its spring, prior to the completion of the cycle of rotation of the clutch; and removable stop means to retain the released clutch-control mechanism against operation by its spring until the main drive shaft has substantially completed its movement.

2. In an accounting machine having a main drive shaft; the combination with a power-driven clutch; of clutch-control mechanism normally latched in position to maintain the clutch disabled; a spring to shift the clutch-control mechanism to free the clutch for operation; a starting key; means operable by the starting key on depression thereof, to unlatch the clutch-control mechanism to free it to the action of its spring; connections between the clutch and the main drive shaft; said connections operable during the first half revolution of the clutch to restore the clutch-control mechanism to its latched position; means operable from the main drive shaft driving the first half revolution of the clutch to positively restore the starting key to its normal position, and to release the starting key early in the second half revolution of the clutch, to enable the starting key, upon depression prior to the completion of the second half revolution, to unlatch the clutch-control mechanism for operation by its spring; and stop means also under control of the main drive shaft to arrest the clutch-control mechanism against the action of its spring, until the main drive shaft has substantially completed its movement.

3. In an accounting machine, having a main drive shaft, the combination with a power-driven clutch; of clutch-control mechanism, including a clutch-disabling member; shifting means operable upon the clutch-disabling member to move it to effective position, a spring to displace the shifting means relatively to the clutch-disabling member, and a latch member to retain said shifting means effective against the tension of the spring; a starting key to release the latch and free the shifting means to the action of its spring; connections, including a link, between the clutch and the main drive shaft, said link operable to restore the latch and clutch-disabling member to their effective positions; means operable by the main drive shaft to positively restore the starting key to normal position during the first half cycle of the clutch, and to release the starting key early in the second half cycle of the clutch, to enable the latter, upon depression prior to the completion of said second half cycle, to release the latch to enable the spring to displace said shifting means; and stop means insertable into and removable from the path of the clutch-control mechanism to delay the operation of the clutch-control mechanism by the spring until the main drive shaft has substantially completed its return to normal position.

4. In an accounting machine having a main drive shaft, the combination with a power-driven clutch; connections between the clutch and the main drive shaft; and a starting key; of means to increase the number of cycles of the main drive shaft possible in any given period without increasing the speed at which the main drive shaft is driven, including clutch-control mechanism normally latched in position to maintain the clutch disabled; a spring operable upon the clutch-control mechanism to free the clutch for operation; means operable by the starting key to free the clutch-control mechanism to the action of its spring; means to positively restore the starting key and its clutch-control release means to normal position during the first half cycle of the main drive shaft; means to restore the clutch-control mechanism to latched position during said first half cycle of the main drive shaft; said positive restoring means being operative early in the return cycle of the main drive shaft to release the starting key for depression to free the clutch-control mechanism to the action of its spring, prior to the completion of said return cycle; and stop means removably insertible in the path of the clutch-control means to temporarily delay the automatic operation thereof under the influence of its spring.

5. In an accounting machine having a main drive shaft, the combination with a power-driven clutch; and a drive connection between the clutch and the main drive shaft; of clutch-control means; means settable prior to the completion of one operation of the main drive shaft and clutch, to trip the clutch-control means for the automatic performance of a succeeding operation; stop means shiftable to effective and ineffective positions and operable in its effective position to delay the actual conditioning of the clutch for such succeeding automatic operation until the main drive shaft shall have completed the effective portion of its instant stroke; and means to positively restore said settable means to normal position at each operation of the clutch.

HERMANN RAUH.